C. H. HUTCHINSON. Improvement in Balance Slide Valves.

No. 5,090. Reissued Oct. 8, 1872.

Witnesses:

John Becker.

Francis McArdle.

Inventor:

C. H. Hutchinson

Per

Attorneys.

AM. PHOTO-LITHOGRAPHIC CO. N.Y. (OSBORNE'S PROCESS)

UNITED STATES PATENT OFFICE.

CHARLES H. HUTCHINSON, OF CONCORD, NEW HAMPSHIRE.

IMPROVEMENT IN BALANCED SLIDE-VALVES.

Specification forming part of Letters Patent No. 119,769, dated October 10, 1871; reissue No. 5,090, dated October 8, 1872.

*To all whom it may concern:*

Be it known that I, CHARLES H. HUTCHINSON, of Concord, in the county of Merrimack and State of New Hampshire, have invented a new and useful Improvement in Balanced Slide-Valves, of which the following is a specification:

My invention consists in the improvement of slide-valves, as hereinafter fully described and subsequently pointed out in the claim.

Figure 2:
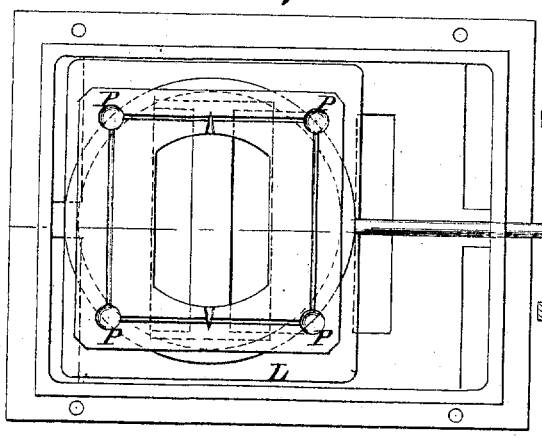
Figure 1:
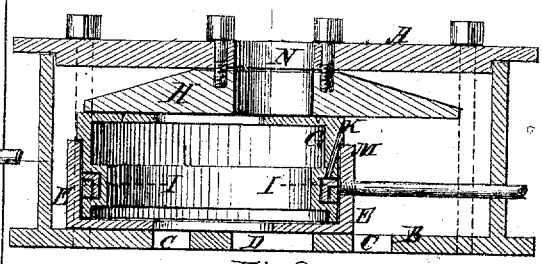
Figure 3:
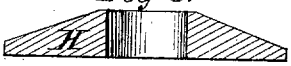
Figure 5:
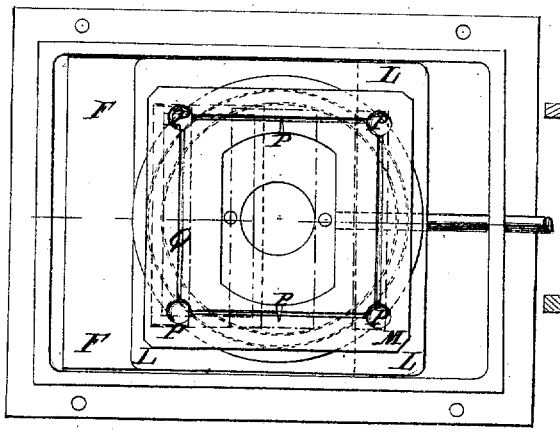
Figure 4:
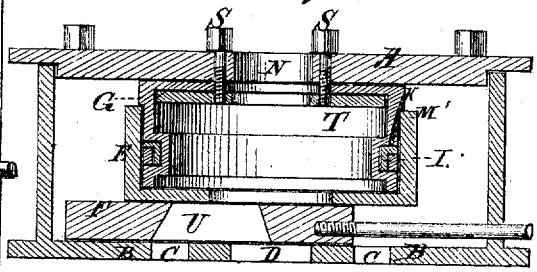
Figure 6:
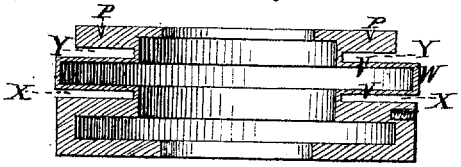
Figure 7:
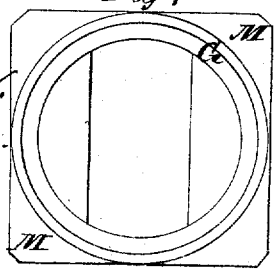

Figure 1 is a longitudinal sectional elevation of my improved balanced-valve arrangement as applied when the valve and balancing devices are to reciprocate together. Fig. 2 is a plan of Fig. 1, with the top plate removed. Fig. 3 is a section of the plate employed for counteracting the warping and springing of the top of the valve-chest. Fig. 4 is a section showing the arrangement when the balancing devices do not reciprocate with the valve. Fig. 5 is a plan view of Fig. 4 with the top plate removed. Fig. 6 is a section showing the manner in which a spring may be used for connecting the balancing-plates, instead of the piston and cylinder arrangement, and for use in connection with steam pressure for maintaining steam-tight bearings at the top and bottom of the steam-chest, while limiting the down pressure of the valve. Fig. 7 is a plan view of the bottom of the upper plate and its cylinder.

Similar letters of reference indicate corresponding parts.

A is the top of the steam-chest, and B the bottom or valve-seat. C represents the live-steam ports, and D the common exhaust-port. This may be used with my improved valve when not exhausting through the top, but is not needed when so exhausting, which I propose to do, generally. E is a vertical cylinder, which, in one arrangement, may be the valve also, and slide on the valve-seat, as indicated in Fig. 1; or, it being stationary, may rest on a valve, F, sliding under it, as in Fig. 4. G is another cylinder, fitting into cylinder E, with its face bearing against the under side of the plate H, attached to the under side of the top A of the steam-chest, and provided with ordinary piston-packing I in the part working within cylinder E, to be forced out against the wall of cylinder E by steam let in behind it through a passage, K; or it may be any approved packing. Both of these cylinders have a rectangular plate or flange at the end fitting against the wall of the steam-chest, as indicated in Figs. 2 and 5, L being the flange of cylinder E, and M the flange of cylinder G. The steam pressure on these flanges is the measure of the force with which they are confined to the seats, and the action is governed thereby, except in the case of the lower cylinder, which also receives pressure on its upper end at M′. The balance of the area of the valve is not subject to pressure, by reason of the steam being excluded from it by the cylinder G and its plate. The pressure of the valve on the valve-seat may therefore be fixed at any given amount by the size of the flange. I propose to make these cylinders hollow, and to provide an opening, N, through the top of the valve-chest for exhausting thereat, and when so arranged the port D will not be required; but, instead, an opening will be made directly up through the valve-cylinders and steam-chest. As the top of the steam-chest is liable to spring upward by the action of the steam, and in such case becomes so warped or cramped that a steam-tight joint cannot be maintained between the face of cylinder G and it, a plate, H, is introduced between them, with a broad face at the under side for said cylinder to work against, and a contracted central upper face to form the point of connection with the steam-chest top, which allows it to rise and fall with the steam-chest top without warping, as it must, if suspended below the top of the steam-chest by bolts or the like connected at or near the corners, for when so suspended the springing of the top of the steam-chest will cause the plate to spring, more or less, as the top does; whereas, if connected at the center only, it will merely rise and fall with that part of the top. Moreover, by connecting in this manner it may fit steam-tight against the under surface of the chest-top, and thus exclude the steam from the bolts by which it is secured, and preserve them from the destructive acids generated from the oil; or I may dispense with the bolts and have the said shield H cast together with the top of the steam-chest, and thus economise considerably in the cost. I have found in practice that when the area of the upper surface of the flange or face of cylinder G, working against the upper wall of the steam-chest, is about equal to the area of the under side of said flange subject to steam pressure, the cylinder G is liable to dance or vibrate rapidly in consequence of steam working in between the top of it and the under side of plate H, and balancing the upward pressure on the under side of the flange, so that the weight of the cylinder, together with the jarring it is subject to, and the variations in the steam pressure, will combine to prevent it from being kept steadily on the surface of the said plate H, but this is readily obviated by having the grooves Q and cavities P and the escape-passages P′ formed in the upper surface of the cylinder, so that the steam so leaking in between the cylinder and plate will escape to the exhaust as soon as it arrives at the passage, and thus it cannot spread over the whole area of the top of the cylinder to have sufficient force to counterbalance the up-pressure, as it must have before the dancing above described will take place. The nearer these cavities and grooves are to the edges of the flange the more certain will be the result; but, practically, it is only requisite that the area of the upper surface of the flange outside of the grooves be materially less than the area on the under side of the flanges, upon which the upward pressure is exerted. The cavities P are not absolutely essential, for a mere groove extending all the way round will suffice. By the use of these escape-passages for the steam thus leaking in I am enabled to retain more ample wearing surface on the top of the cylinder than I otherwise could, for in order to prevent the dancing of the cylinder without the said escape the area of the wearing surface would have to be greatly reduced around the opening through the top of the cylinder. From the space within the cylinder G the steam so escaping may escape through the exhaust, in case it is suitably arranged therefor, as represented in this example; but if the exhaust is otherwise arranged, a special exhaust-passage may be made for it through the steam-chest cover. In case the valve F is used the said cylinders will not reciprocate, but will be secured to the top A of the valve-chest by bolts S and a disk, T, as in Fig. 4, or by any other suitable means. The said valve will have an opening, V, for the escape of the steam to the passage N. Instead of fitting these cylinders together by steam-packing, as in Figs. 1 and 4, I may connect them by a spring consisting of two disks or wide flat rings, V, joined at the periphery by a narrow ring, W, and produce the same results, regulating the pressure by the amount of the surfaces X and Y for the steam to act upon.

Having thus described my invention, I claim as new, and desire to secure by Letters Patent—

1. The combination, with shield H, of the cylinder G, having a square flange, M, and working directly against the under side of said shield, as and for the purposes specified.

2. The arrangement of fixed cylinders E G and slide-valve F in a steam-chest, when all are constructed as shown in Fig. 4 of drawing, and for the purpose specified.

3. The cylinder E, the cylinder G, fitting thereinto, the steam-chest A, and plate H, combined and arranged as and for the purpose described.

4. The cylinder E having flange L, combined with cylinder G having flange M, grooves P Q, and escape-passages P′, arranged as and for the purpose described.

C. H. HUTCHINSON.

Witnesses:
A. P. THAYER,
ALEX. F. ROBERTS.